(12) United States Patent
Eisenson

(10) Patent No.: US 8,104,681 B2
(45) Date of Patent: Jan. 31, 2012

(54) INVENTORY BALANCING SYSTEM

(76) Inventor: Henry Eisenson, San Diego, CA (US)

(*) Notice: Subject to any disclaimer, the term of this patent is extended or adjusted under 35 U.S.C. 154(b) by 880 days.

(21) Appl. No.: 12/214,587

(22) Filed: Jun. 20, 2008

(65) Prior Publication Data

US 2008/0314981 A1    Dec. 25, 2008

Related U.S. Application Data

(60) Provisional application No. 60/936,647, filed on Jun. 21, 2007.

(51) Int. Cl.
*G06F 17/00* (2006.01)
*G06F 19/00* (2011.01)
*G06F 17/50* (2006.01)
*G06K 15/00* (2006.01)
*G06Q 30/00* (2006.01)
*G06Q 90/00* (2006.01)
*G06Q 10/00* (2006.01)
*A01K 5/02* (2006.01)
*G05B 19/00* (2006.01)

(52) U.S. Cl. .......... 235/385; 235/375; 235/383; 705/28; 705/29; 340/5.92

(58) Field of Classification Search ............... 705/28, 705/29; 235/385, 383, 375; 340/5.92
See application file for complete search history.

(56) References Cited

U.S. PATENT DOCUMENTS

| | | | |
|---|---|---|---|
| 6,324,522 B2* | 11/2001 | Peterson et al. | 705/28 |
| 2002/0178093 A1* | 11/2002 | Dean et al. | 705/28 |
| 2005/0060242 A1* | 3/2005 | Armstrong et al. | 705/28 |
| 2006/0041443 A1* | 2/2006 | Horvath | 705/1 |
| 2006/0195563 A1* | 8/2006 | Chapin et al. | 709/223 |
| 2006/0287873 A1* | 12/2006 | Heard | 705/1 |
| 2007/0239569 A1* | 10/2007 | Lucas et al. | 705/28 |
| 2008/0027836 A1* | 1/2008 | Chapin | 705/28 |
| 2008/0040132 A1* | 2/2008 | Foth et al. | 705/1 |
| 2009/0125411 A1* | 5/2009 | Otto et al. | 705/26 |
| 2010/0174592 A1* | 7/2010 | Batoff | 705/14.11 |
| 2011/0050423 A1* | 3/2011 | Cova et al. | 340/572.1 |

* cited by examiner

*Primary Examiner* — Daniel Walsh

(57) ABSTRACT

A system by which a central hub and transport means, listing means, matching engine, and operating method will capture overstock and understock information from participating retailer or distributor nodes and create congruent matches, with subsequent shipments of one to the other to improve the inventory of both nodes.

5 Claims, 4 Drawing Sheets

INVENTORY BALANCING SYSTEM

CROSS REFERENCE TO RELATED APPLICATIONS

The present application claims the benefit of priority of U.S. Provisional Patent Application No. 60/936,647, filed Jul. 21, 2007 for Henry Eisenson. the entire content of which is incorporated herein by reference.

FEDERALLY SPONSORED RESEARCH OR DEVELOPMENT

Not applicable

BACKGROUND OF THE INVENTION

The present invention relates generally to the field of product distribution, where imperfect stocking or manufacturing decisions can result in accumulations of excess inventory at some points, and deficiencies of inventory at other points. The present invention provides a system by which retailers and distributors can cost-effectively and profitably equalize inventory, facilitating the movement of items from geographic markets and participating nodes in which they are slow-moving to geographic markets and participating nodes in which they are faster moving, via a centralized transport system and transaction engine that acts as a virtual vendor.

There exists a spectrum of methodologies by which inventory is managed by multiple outlets, distributors, wholesalers, and manufacturers with multiple distribution points and channels, all intended to improve profitability of the overall system by improving the relationship between the cost of maintaining inventory and the revenue generated by that inventory. The systems and methods of the prior art attempt to manage inventory by forecasting and optimizing movement of inventory from manufacturer to consumer. These inventions are directed towards such things as systems and methods for managing the rate of use of inventory by a node in the system and calculating therefrom the proper time for ordering more inventory. And, systems and methods exist for moving inventory from storage to the sales floor, or as a return to the manufacturer, before the storage cost per item causes the retailer's profit to significantly diminish even further than any restocking charge imposed by the supplier (often called the "vendor").

United States Patent Application No. 2006/0195563 by Christopher Chapin, et al, entitled Peer to Peer Inventory Management System describes an inventory matching method and system by which overstock and understock inventory can be listed by similar retailers, and matches made enabling retailers with an overage of a given item to ship it to another retailer whose market seeks more than the normal supplier can deliver. That application describes a unique matching engine which can examine many thousands of listings by many thousands of nodes of a system, and efficiently make matches that solve congruent problems. However, that application requires that shipper and recipient become known to one another, and that the transaction include payment by the recipient to the shipper, and often that is inconvenient or impossible, particularly when those two nodes are also competitors or members of competing chains. That matching engine is exploited by the present invention, which addresses those deficiencies and permits transactions even between competitors.

U.S. Pat. No. 6,643,626, issued to Perri de Resende and titled Sales Point Business Method and Apparatus, generally describes remotely monitoring a display case having merchandise. The described purpose for remotely monitoring the display case is to assure that authorized users are accessing the merchandise, to monitor transactions involving the merchandise, and/or to provide security against theft, fire and other hazards. This invention allows for the remote monitoring of merchandise to detect the depletion of the merchandise, whether by desired or undesired means. The invention does not provide a means for managing the merchandise inventory amounts.

U.S. Pat. No. 6,405,177, issued to DiMattina and titled System for Securing Commercial Transactions Conducted On-Line, generally describes a system and method allowing on-line retailers to offer guaranteed financial services in addition to their goods. The financial services are such things as secure credit card transactions, price guarantees; guaranteed delivery and return policies and implied warrantee guarantees. The system for accomplishing this method comprises a purchaser-retailer transaction means, a single action ("one click") component, and a means for sending the financial services certificate to the purchaser. While this patent is related to selling an inventory and optimizes that process, it does not manage inventory.

United States Patent Application No. 2005/0075945, by Matsumoto et al. and titled Inventory Management and Ordering System, and Ordering Management System Using the Previous System, describes a system for managing a business inventory. The system monitors the quantity of an item inventory and the rate of use is determined so that future order dates can be predicted. Orders are placed based on the forecast, thereby keeping an adequate supply of an item. While this invention recognizes the need for inventory management, it focuses only on timely ordering of supplies to maintain an item on hand and provides no mechanism for rectifying errors.

United States Patent Application No. 2005/0033666, by Kurashige and titled Inventory Management Method and Program Product, generally describes a management server having an inventory database, a purchase database and a sales database. The server is designed to track certain inventory indicators and uses these indicators to move goods from inventory to sales. By tracking these indicators, inventory that is kept in storage can be moved to sales before the cost of the storage factored into each good diminishes the profits. It is desirable to keep products flowing from storage to the sales floor and in turn out the door. But, this does not address the problems of inventory that does not sell at one location, or inadequate inventory to meet demand at another.

United States Patent Application No. 2005/0004831, by Najmi et al. and titled System Providing for Inventory Optimization in Association with a Centrally Managed Master Repository for Core Reference Data Associated With an Enterprise, describes a system and method for developing an inventory plan for a supply chain. The supply chain is defined as the chain of participants beginning with suppliers including the manufacturers and vendors and ending with the consumer. The inventory plan is an optimized plan that assures that the members of the supply chain are able to predict proper inventory amounts based on a variety of defined metrics. If metrics reach a critical/problematic point, the plan is adjusted accordingly. New metrics can be added. This invention recognizes and addresses the problems with overstock and understock in a supply chain and attempts to develop a dynamic inventory plan that will prevent the occurrence of these problems. However, given the unpredictable nature of the consumer, this invention cannot address inventory problems that arise from an unexpected change in consumer demand, and does not provide a means by which inventory can be equalized between different nodes experiencing congruent problems (matching overstock and understock of the same inventory item).

At any level (manufacturer, distributor/wholesaler, or retailer), inventory excess is expensive, and there have evolved many business methods for dealing with the problem. The most visible is to discount the price from the planned one, motivating buyers in the chain to move the merchandise. A second solution is to return the inventory to the source—the manufacturer—and pay any imposed restocking charge. Both have the effect of reducing margins and therefore profits, but are better business method solutions than languishing and obsolescing inventory.

Another method for dealing with the problem is to package such obsolescing product, discount it, and ship it to off-price distributors and retailers, which has the same net effect of reducing margins and profits. Both of these steps have another effect that is highly negative and not as visible; branded merchandise appears for sale at a discount, which manufacturers (owners of such brands) work hard to prevent. Many brands are protected aggressively. There are often agreements between the distribution system and the manufacturer or importer intended to prevent such discounted sales, or transfers to distribution that is not pre-authorized by the manufacturer or importer, and violations of such agreements can cause termination of a sales franchise.

In the case of overstock, branded merchandise manufacturers often establish a buy-back program to help prevent discounting by authorized outlets, and to help prevent their merchandise from reaching discount outlets. Such returns come at a high price, however. First, they result in a credit against future orders, which does not help a cash-needy situation. Second, they are credited at a high discount compared to the original shipping invoice (15% or more, as a restocking charge). Third, retaining the right to sell a particular brand often requires maintenance of a certain volume of sales, and returns negatively impact that volume and can jeopardize retention of that sales franchise. Fourth, vendors/suppliers often control how the retailer can spend credits for returned merchandise.

Another business method that has emerged to deal with the problem is clandestine shipment by an authorized dealer in branded merchandise to an unauthorized dealer. This is usually a violation of the contract between the authorized dealer and the distributor or manufacturer, and sometimes occurs via nighttime transfers to trucks in alleys, but has the effect of converting excess inventory into ready cash. The risk is to the franchise held by the authorized dealer, but in the absence of trackable serial numbers that risk is small, and the result is a loss of brand protection.

Excess inventory is expensive, and its value decreases steadily. That decrease is often more rapid than the rate of sale of the stock, and waning sales revenue often will not replace the cost of buying the inventory in the first place. Tax authorities recognize the situation and permit deductions for obsolescing inventory, acknowledging that costly aspect of doing business in a supply-demand system where prediction is imperfect. A cost-effective business method that satisfies the problem would increase profit for every link in the supply chain.

For these reasons and more, all components of the system including manufacturers, wholesalers/distributors, and retailers seek ways and means to relieve the excess inventory problem.

One potential solution to a deficiency in inventory is to place an order for more. At the retail level, and sometimes at the wholesale/distribution level, this solution is often impractical. When the original imperfection in judgment resulted in one or two items selling out earlier than expected, or the unplanned success of a particular style or color of an item, it may not be cost-effective to place a re-order if there are minimum order quantities, or penalties when orders are below some threshold. Some items, in fact, may be orderable only in arrays that consist (as an example) of one gross of each color. When an item sells out in the two colors of a local university, for example, it may not be cost effective to order twelve gross, ten gross of which will languish along with the original shipment.

In many such cases, the deficiency remains unsatisfied because there is no method by which the order can be cost-effectively filled.

Further, re-order items may not be available at the factory or distributor level because they are back-ordered, closed out, or discontinued, resulting in lower profitability for the retailer whose inventory is comprised of partial size runs or limited color options, etc., making the product difficult to sell.

When all components of a distribution network are members of the same closed logistics system, and all are interconnected by inventory management software, communications, and logistics mechanisms (shipping means), software can be devised to (1) recognize inequities, (2) react to trigger points, (3) make recommendations to management, (4) monitor the logistical implementation of solutions, and (5) create data structures that suggest improvements to ordering protocols that lessen the likelihood of repetitive problems. There are prior art business methods by which closed/chain/franchise distribution systems can be optimized to reduce obsolescence, minimize investment in inventory, improve overall profitability, protect branding, and maintain brand franchises.

At the other extreme, a retailer with a franchise to sell protected branded merchandise will load excess merchandise onto a truck at night and ship it to another outlet, unauthorized by the brand manager, and despite any obligation to not do such illicit dealings. In a sense, this method is also "prior art".

Between these two points exist many different potential solutions, of which none works well enough to satisfy the preponderance of the inventory-balancing problems in the real world marketplace.

One problem with many existing inventory management systems is that they report to management when a given monitored item reaches a re-order level at a given location or storage point, but do not compare levels of different locations or storage points and report comparative levels.

Another problem with existing inventory management systems that monitor inventory levels at multiple sites is that they are not constructed to consider the value of the equalization of inventory between nodes (locations, or storage points, or distribution points).

Another problem is that many such systems do not provide a mechanism to recognize the cost of an overstock at one point, with aging and obsolescing inventory, with a simultaneous understock at a second point, with loss of sales due to nonavailability.

Another problem is that many such systems that do provide a mechanism that recognizes the importance of differential inventory levels, due to geographic preferences or errors made in placing orders, usually stop re-orders of obsolescing inventory and increase orders of understocked inventory, thus correcting the imbalance over time but in the least profitable manner.

Another fundamental problem with all such existing inventory management systems is that they apply exclusively to members of an integrated organization and not to transients or otherwise unaffiliated business units, and therefore the beneficiaries of such systems are only those who are part of that organization. For example, such a system that addresses the national distribution of product X might have the potential to do so for the organization that "owns and operates" the system, but not for the sole-site business that might benefit from its use, even if that sole-site's participation might assist the organization that operates the system by reducing its logistics costs.

One of the problems with known inventory balancing methods is that they normally affect ordering processes, reducing the input of an item that is stagnating and increasing the input of an item that is selling at unexpectedly high levels. This creates a substantial lag between the detection of a problem and the beginning of a solution, and the nature of the retail supply chain is such that lag is costly as it represents either stagnating inventory (cash that is not productive) or absent inventory (lost opportunity).

Another problem with known inventory balancing methods is that they are generally single-node, involving one business entity at a time, and can use only the flow rates at that location to correct the problem.

While many of the prior art inventory management and equalization solutions may be suitable to one degree or another for the particular limited requirements they address, they are not optimum or generalized solutions for broad and diverse multi-node retail, wholesale, and distributor markets. Nor do they meet the needs of transients passing through the system to satisfy inventory imbalance requirements, and are not sufficiently flexible to be adaptable to the needs of many potential users.

In view of the foregoing disadvantages inherent in the known types of inventory balancing, particularly as they might apply to cost-effectiveness, the present invention provides a new approach that overcomes deficiencies appearing in the prior art, and creates a new category of inventory balancing system with certain advantages and characteristics not available from those appearing in the prior art.

The main objective of the present invention is to provide an inventory balancing system, in a form, at a cost, and with such functionality as to improve the performance of the retail supply chain.

Another objective of the present invention is to provide a means by which overstock inventory that cannot be cost-effectively returned to the supplier or cannot be returned at all can be listed in an online database, while understock inventory that cannot be acquired from that same supplier can be similarly listed, and matches made to solve the problem of all participants.

Another objective of the present invention is to utilize a software matching engine that sorts through large numbers of such listings by many diverse and otherwise not coordinated nodes, to make matches whereby the same item is overstock in one location and understock in another location.

Another objective is to permit communication with a hub, comprised of a transportation means or Carrier that can efficiently pick up the overstock inventory and deliver it to the location where that same item is needed, in a manner that permits intimate cooperation between members of a chain, and also enables competing shippers and receivers to remain ignorant of the other's identity or location.

Another objective is to provide an accounting means by which the process is reported to central management of a chain, or when participants are not members of the same chain the account of the shipper is credited when the overstock inventory is picked up, and the account of the receiver is debited when that inventory is delivered.

Another objective is to provide a new source of revenue to the hub, which can impose a service charge on the shipping node (comparable to a restocking charge) and a shipping charge to the receiving node (comparable to the charge that the receiving node would pay if the shipment came from the original vendor).

Other objects and advantages of the present invention will become obvious to the reader and it is intended that these objects and advantages be within the scope of the present invention.

To the accomplishment of the above and related objects, this invention may be embodied in the forms illustrated in the accompanying specification and drawings. However, the specification and drawings are illustrative of the basic concepts only; there are many possible configurations and derivatives lying within the intended scope of the invention.

BRIEF SUMMARY OF THE INVENTION

The present invention enables logistically-congruent RETAILER NODES to move inventory from where consumers don't want it to locations where consumers do want it, thus enabling faster inventory turnover and reducing the requirements for markdowns, and enabling participating retailers to carry less inventory to achieve the same level of revenue.

A common Carrier, with vehicles, trains, aircraft, facilities, and people constitute HUB and network, elements of which already extend into the various retailer nodes participating in the system.

Independent RETAILER NODES can define overstock and understock conditions in a data file on a LISTING WEBSITE (per Chapin, et al) and a software MATCHING ENGINE (per Chapin, et al) identifies logistically-congruent matches (overstock and understock of the same item). Software unique to the present invention then produces a coded shipping label on a printer at the node with the overstock condition.

Networked RETAILER NODES (members of a chain) will benefit from common management of retail processes and inventory controls to detect opportunities for inventory equalization.

The shipping node transfers the overstock inventory to the mobile extension (truck, etc.) of the HUB with the coded shipping label attached, which is then read and converted to a conventional shipping label that discloses the destination and thereby supports conventional processing of the shipment. That reading and converting can occur within the vehicle of the HUB, or at a central collection site.

When applied to independents, each such shipment a credit is applied to the account of the shipper (minus a possible service charge) and a debit is applied to the account of the recipient (plus a possible transport charge). When applied to members of a chain, the Carrier of the present invention will interface with the chain to provide accounting and inventory data.

The HUB, with the online ability to solve sales rate problems among retail nodes, can pick up, transport, and deliver problematic inventory, and to bill accordingly, and therefore acts as a virtual vendor.

The present invention applies equally to supply chain levels above the retailers, including distribution centers (DCs), third-party logistics (3PL) resources, warehousing, and other resources where inequity in inventory levels of a given item can be profitably equalized by the service provided by the Carrier defined herein.

DETAILED DESCRIPTION OF THE INVENTION

The present invention is comprised of several components that collectively constitute a system and method that moves inventory from retail locations where the market doesn't want it to locations where the market does want it.

The HUB is comprised of a common Carrier such as a package transport company with national coverage, trucks, trains, aircraft, sorting facilities, and other resources to permit the efficient pickup, transport, and delivery of packages and the management of the accounting of its customers. For the purposes of the present invention, the HUB is considered to be the entire shipper network, including every truck parked in front of retailers and warehouses, and every driver delivering or picking up shipments.

The LISTING WEBSITE is an online portal that can accept listings of any number of brands or types of inventory. The nodes with overstock and understock conditions of various inventory items logs onto the website and lists their requirements. Logon and listing can be manual by staff, or automated by an interface with the node's point of sale system; results are the same but the labor changes.

The MATCHING ENGINE is that defined in prior art in Chapin, et al. It can be operated by the HUB, or as a contractor to the HUB, but is the mechanism by which the nodes of the system list their requirements and their requirements are matched one to another.

The LABELING METHOD is the system that enables the shipping node to communicate with the HUB. When a node lists an overstock condition of a given inventory item, and the MATCHING ENGINE makes a match, that node is notified and a code is provided. The shipping node can accept or reject the instruction to ship (for example, based on whether the inventory is still on hand). If the shipping instructions are accepted the code is printed by the LABELING METHOD in the form of a bar code on an adhesive label, which excludes the identity of the shipper and excludes the identity and location of the intended recipient.

The LABEL READING METHOD is the system used by the mobile element of the HUB to read the bar coded information on the shipper's label, after the shipment is aboard the HUB's transport means. A printer aboard the transport means then generates a recipient's label, which includes destination identity and address. Therefore, only the HUB knows the identity of both the shipping node and the recipient node.

The ACCOUNTING METHOD is used by the stationary element of the HUB to credit the account of the shipper of the overstock inventory when it is picked up, and to debit the account of the recipient when that inventory is delivered.

DESCRIPTION OF THE DRAWINGS

Figure 1:
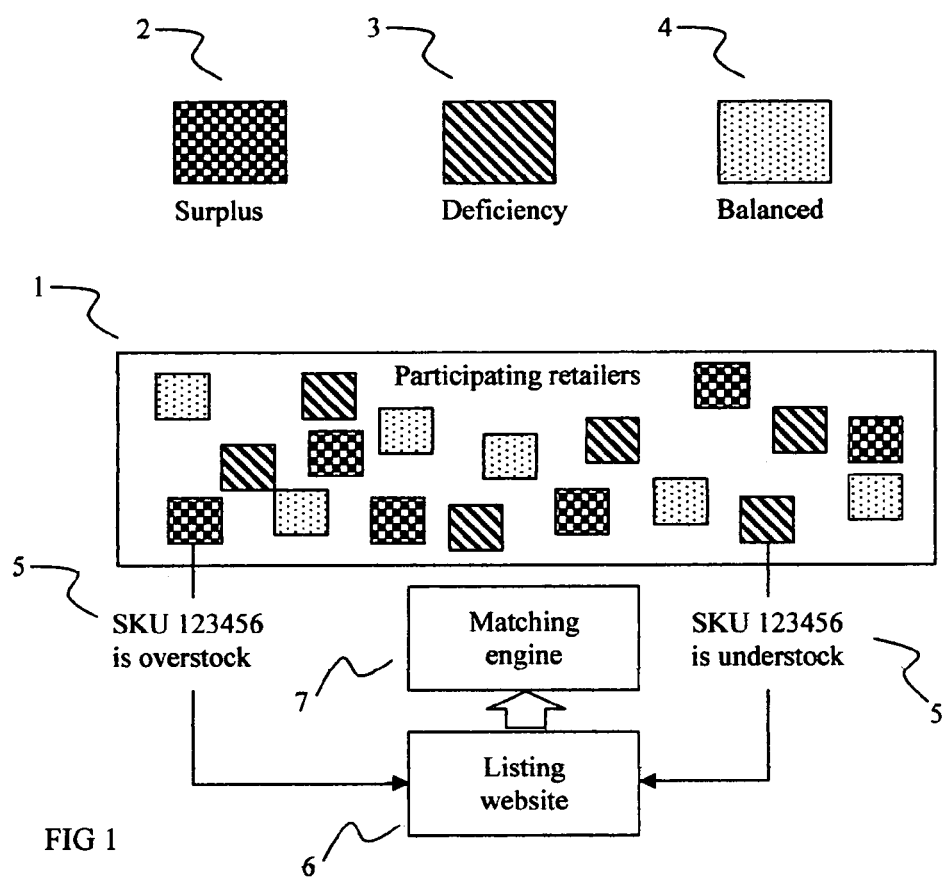
FIG. 1 is a general view of the problem to be solved by the present invention, with the listing process depicted.

FIG. 1 shows the problem solved by the present invention, in which a number of participating retailers 1 suffer from a surplus 2, a deficiency 3, or a correct level 4 of a particular stock item 5. Those retailers have the opportunity to list their needs in a listing website 6, which supplies a matching engine 7 that compares such listings from across the country and matches congruent problems (a deficiency with a surplus).

Figure 2:
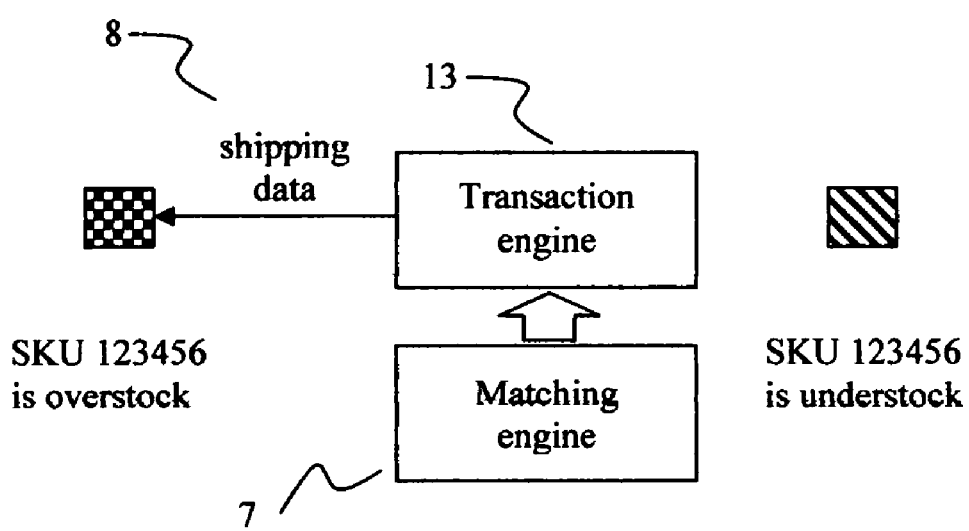
FIG. 2 shows the result of an inventory match.

FIG. 2 depicts the result of a successful match by the matching engine 7, which generates a coded shipping label 8 at the site of the node with the overstock condition 2, all monitored and managed by the transaction engine 13.

Figure 3:
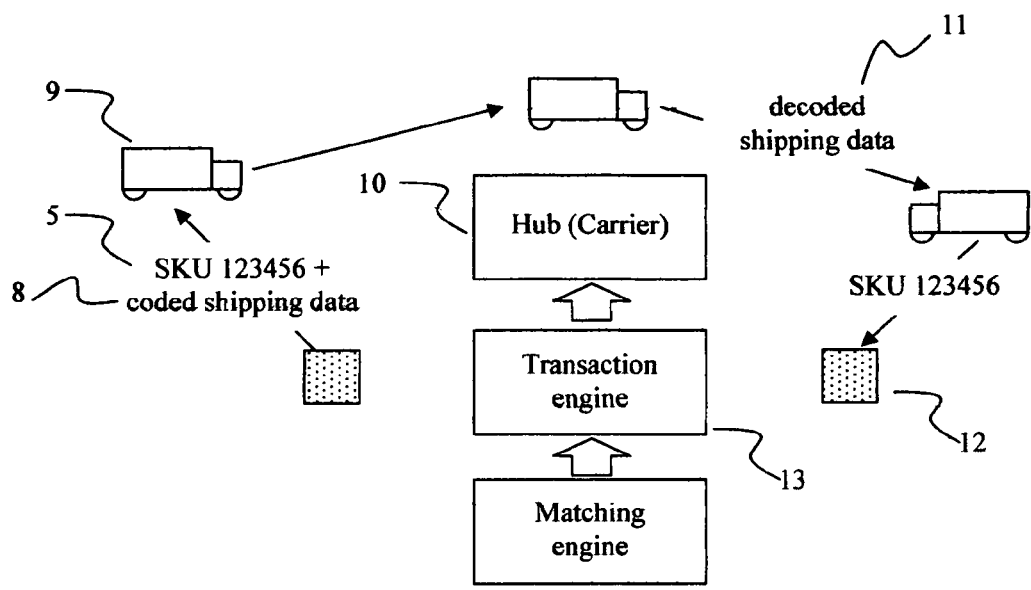
FIG. 3 shows an overview of the HUB functions.

FIG. 3 shows the problematic stock item 5 plus coded shipping data 8 embarking on a shipping means 9 operated by hub 10. At either pickup or at a central shipping processing facility, the coded shipping data 8 is converted into a destination label 11 and further transported to the recipient 12, thus balancing the inventory of both the shipper and the recipient regarding that particular stock item, all managed by the transaction engine 13.

Figure 4:
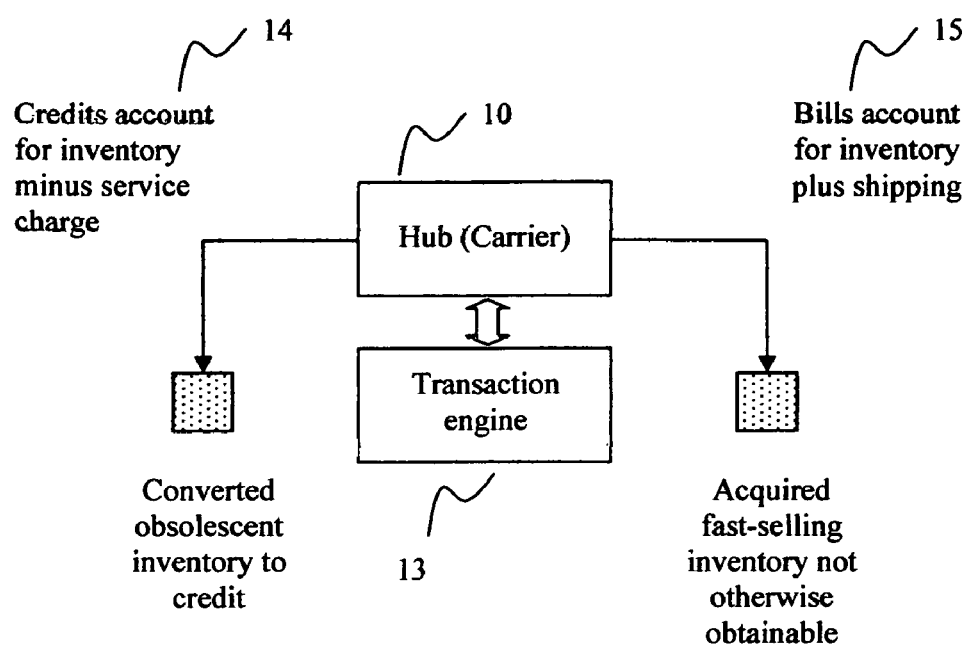
FIG. 4 shows accounting functions provided by the HUB using data collected and provided by the transaction engine.

FIG. 4 shows the hub 10 exchanging data with the transaction engine 13 to generate a credit to the account of the shipping node for inventory shipped minus a service charge 14, and a debit to the account of the receiving node for inventory received plus a shipping charge 15.

DESCRIPTION OF THE PREFERRED EMBODIMENT

In the preferred embodiment, the present invention is applied to retail store members that stock similar items. They have access to a website provided by the hub and the vendor/supplier of the merchandise, on which they can list overstock and understock inventory using unique identifiers such as Stock Keeping Unit (SKU) or model number. A software matching engine matches requirements and a transaction engine generates shipping information that is coded, so a shipper that is a potential competitor of the recipient will not know where the shipment came from. The hub operates trucks that pick up such shipments and at some point in the transport chain the coded shipping information is decoded and converted into a conventional destination label, with the shipper identity omitted. The hub system then uses data collected in the transaction engine to apply a credit to the account of the shipper and a debit to the account of the recipient, less fees and shipping charges.

I claim:

1. A system for a carrier to provide an inventory equalization service to a client, the system comprising:
   (a) at least two geographically separate nodes of each client;
   (b) a carrier-operated hub at which retailer identification is removed from product packaging to produce a resalable condition of the products;
   (c) carrier-operated vehicles to collect inventory from participating retail nodes where a surplus inventory is present and deliver the surplus inventory to the hub, collect said surplus inventory at the hub after processing and deliver the surplus inventory to the participating retail nodes where the surplus inventory is needed;
   (d) at least one communication means to interconnect system participants; and
   (e) a labeling system at a shipping node to print and apply a label to the surplus inventory for shipment, the label excluding the identity of the shipper and the identity and location of the recipient;
   (f) a label reading system at the vehicles to read the label and generate a recipient label including destination identity and address;
   (g) an accounting system of the hub to credit the account of the shippers when the surplus inventory is picked up and to debit the account of the recipient when the surplus inventory is delivered, and wherein the clients can include transients, unaffiliated businesses or competing businesses.

2. The system of claim 1, comprising a software and hardware data processing system further comprising:
   (i) a retail system chain-wide inventory database that is updated by retail process and inventory management software and programmed to identify surpluses and deficiencies within the chain, and is accessible by said nodes via said communication means;
   (ii) a human interface whereby cost-effectiveness, logistics, and other parameters can be set by management;
   (iii) a comparison means by which the software correlates surpluses and deficiencies;
   (iv) a transaction management means wherein the communication means transmits inventory deficiencies and surpluses to the comparison means, wherein compatible matches result in transport instructions being acted upon by the hub, and the carrier-operated vehicles providing inventory transfers to complete the compatible matches.

3. The system of claim 1, further being replicated at geographically efficient locations to optimize logistical factors between a given hub acting as a distribution center and participating nodes.

4. The system of claim 1, further being applied to retail nodes that are not part of an integrated chain, in which participating independent retail nodes are provided a method for listing surpluses and deficits, vendors are provided a means for controlling distribution of their own branded products, wherein the carrier transports inventory from locations deficient locations, and debits and credits are applied by the carrier to accounts of the individual retail nodes.

5. The system of claim 1, further being applied to distributors and distribution centers to provide inventory balancing at supply chain levels prior to the point where inventory reaches the retailer.

\* \* \* \* \*